No. 808,141. PATENTED DEC. 26, 1905.
G. D. COLEMAN.
METHOD OF MAKING LEAD HYDRATE.
APPLICATION FILED MAR. 18, 1901.
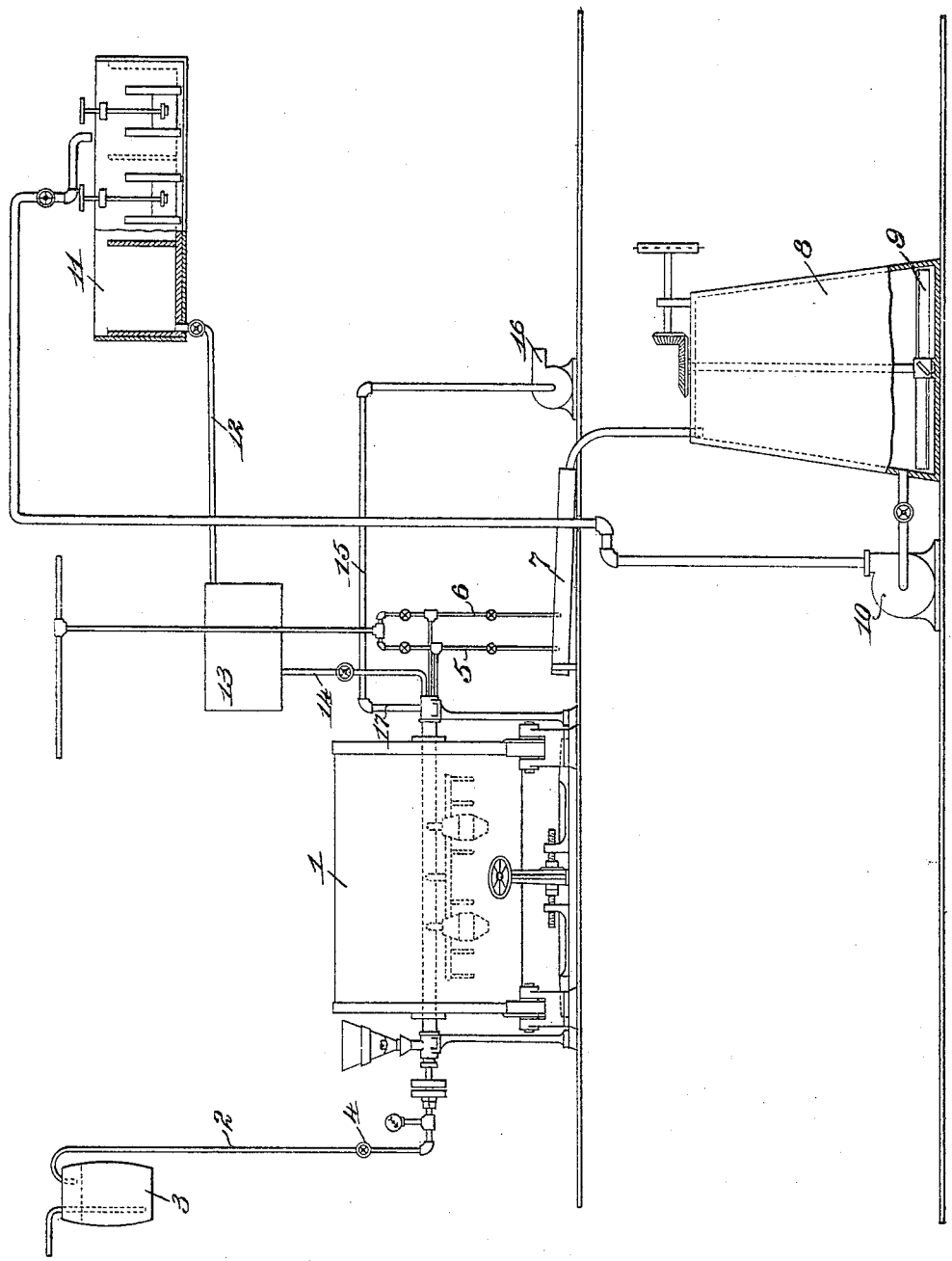

UNITED STATES PATENT OFFICE.

GEORGE D. COLEMAN, OF BOSTON, MASSACHUSETTS.

METHOD OF MAKING LEAD HYDRATE.

No. 808,141.   Specification of Letters Patent.   Patented Dec. 26, 1905.

Application filed March 18, 1901. Serial No. 51,760.

*To all whom it may concern:*

Be it known that I, GEORGE D. COLEMAN, a citizen of the United States, residing at Boston, in the county of Suffolk and State of Massachusetts, have invented certain new and useful Improvements in Methods of Making Lead Hydrate; and I do hereby declare the following to be a full, clear, and exact description of the invention, such as will enable others skilled in the art to which it appertains to make and use the same.

The present invention relates to an improved method of making lead hydrate.

In the manufacture of white lead it is desirable that the proportions of lead carbonate and lead hydrate should be exact or approximately exact, and existing methods of making white lead are, so far as I am aware, unsatisfactory, owing to the fact that it is difficult to secure a product in which the proportions of the two ingredients are exact and uniform, and while it is obvious that white lead might be produced by a mixture of lead carbonate and lead hydrate it is impossible to obtain commercially-pure lead hydrate for this purpose, as no existing method of manufacture is, I believe, adapted to its production in large quantities.

In my Patent No. 649,507 I have described and claimed a method of making lead carbonate which is adapted to the extensive production of lead carbonate suitable for making white lead. According to the present invention I have produced an improved method adapted to the commercial manufacture of lead hydrate in large quantities.

The object of my invention, therefore, is to produce an improved method of making lead hydrate especially adapted to its commercial manufacture in large quantities and of a nature suitable, among other things, for use in the manufacture of white lead.

The present invention consists in the improved method of making lead hydrate hereinafter described and claimed.

In the accompanying drawing I have illustrated an apparatus for carrying out my improved method of making lead hydrate.

My invention contemplates, broadly, the subjection of metallic lead to the action of water and a limited supply of an oxidizing reagent. I prefer to introduce the lead in a comminuted or finely-divided state into a closed receptacle containing water and a limited quantity of oxidizing reagent. Agitation of the contents of the vessel, as by rolling or tumbling, will result in trituration of the lead, which being triturated will be oxidized by the oxidizing reagent and converted to a suboxid and protoxid of lead, the latter, however, being immediately or simultaneously converted into hydrate of lead by combination with water. It is advantageous that this operation should be performed at a temperature not exceeding 100° Fahrenheit where it is desired to make commercially-pure lead hydrate, because if the temperature exceed that limit more protoxid will be formed than can be hydrated by the volume of water in the vessel. If, however, the presence of a small percentage of protoxid of lead is not objectionable in the product, a higher temperature may be employed, which is accompanied by the advantages of more rapid production. The use of such temperatures is clearly within the purview of my invention viewed in its broader aspects. In agitating the contents of the vessel, as by rolling or tumbling, the agitations should preferably be such as not to cause the lead to be much exposed to the direct action of the oxidizing reagent, it being understood that the vessel should preferably not be entirely filled with the lead and water. I prefer that the oxidizing reagent should not be forced into the vessel, but permitted to flow in in accordance with the demand therefor created by the consumption of the oxygen during the operation. The atmospheric air may be used as the oxidizing reagent, and in such case the gradual consumption of the oxygen of the air during the operation will be accompanied by an accumulation of nitrogen. Therefore I apply to the vessel means for drawing off the surplus nitrogen or air deficient in oxygen.

My method may be employed either continuously or discontinuously—that is to say, while I prefer either periodically or continuously to supply to the vessel the reagents employed and continuously to draw off water containing the product my invention also contemplates the placing of the proper quantities of reagents in the vessel and the drawing off of the product after the reagents have been completely converted into the product. I believe the continuous process is much to be preferred to the discontinuous process.

In carrying out the continuous process the vessel is first charged with a given quantity of comminuted lead—as, e. g., eight hundred pounds—and with a quantity of water, which for eight hundred pounds of lead should be about four hundred and fifty gallons, although these proportions may vary without departure from my invention. The vessel is now agitated so as to abrade the comminuted lead by attrition and to bring the particles thereof into intimate contact with the water. The occluded air in the water oxidizes the lead and produces the suboxid and nascent protoxid. The water is refreshed by the air in the vessel. The protoxid being in its nascent state takes up some of the water, and the hydrate of lead is thus formed. This agitation is continued until the water becomes thoroughly saturated with the hydrate of lead, when the drawing off of the hydrate is begun. Owing to the excess of air during this part of the operation, the product is slightly tinged with yellow by the presence of small quantities of the protoxid of lead. In practice I have found it convenient to shut off the supply of air and to introduce into the vessel some carbonic acid, which transforms the excess protoxid of lead into the carbonate. After this excess protoxid is carbonated I begin to draw off the product with some of the water. The product is conveyed to settling basins or filters or other separating apparatus, where the product is separated from the water. The product is principally hydrate; but a small quantity of carbonate is present. The separating process eliminates the principal part of the hydrate and all of the carbonate from the water, which latter is returned to the vessel. When it is desired to produce pure lead hydrate, this portion of the product is collected separately until the product becomes pure lead hydrate, as determined by proper test. If the product of the process is to be used in making white lead, the presence of this small quantity of carbonate is unobjectionable, and in such case this part of the product would not be collected separately. Up to this point the process may be called preliminary to the continuous operation thereof. At this time, therefore, the continuous operation of the process begins, and either at stated intervals or continuously metallic lead, water, and air are introduced into the vessel. The drawing off of the product is accompanied by a drawing off of some of the water. The water carrying the product is conveyed to settling-basins or filters or other separating apparatus where the hydrate is separated from the water. It is impractical to separate all of the hydrate from the water; but the principal part of the hydrate is here separated from the water and the water is returned to the closed vessel. Thus the water forms a vehicle for carrying the product away from the vessel where it is produced to the place where it is collected. The water consumed in the process is replaced by the periodical or continuous supply of additional water. Means are provided for exhausting the surplus nitrogen or air deficient in oxygen from the vessel, and limited quantities of atmospheric air are permitted to flow into the vessel to replace the deficient air and nitrogen withdrawn and the oxygen consumed in the operation. Care must be observed if pure lead hydrate is desired to be produced to keep the temperature of the water below 100° Fahrenheit.

The present invention relates only to the method of making lead hydrate, and any convenient apparatus may be employed in carrying it out.

The apparatus illustrated in the accompanying drawing consists of a corroder 1, which is a closed receptacle adapted to contain water and comminuted lead and into which a limited quantity of oxidizing reagent is introduced. This corroder will preferably be such a machine as is illustrated in my application for Letters Patent for an improvement in corroders, filed April 29, 1901, Serial No. 57,993. It is cylindrical in form and mounted to revolve upon its horizontal axis. The oxidizing reagent, preferably air, is introduced through the pipe 2, having been washed in the washer 3. The valve 4 in the pipe 2 is opened slightly, and in order to admit a limited quantity only of air the product of the attrition is siphoned off through the siphons 5 and 6 and is conveyed, by means of the trough 7, to a receiver 8, which is provided with paddles 9. A pump 10 is employed to pump the product from the receiver 8 into the settling-basins or filters 11, from which the separated water passes through the pipe 12 to the tank 13, back through the pipe 14 to the corroder 1. The pipe 15 is employed to exhaust the excess nitrogen from the corroder conveniently by means of a blower 16, the valve 17 in the pipe 15 being normally closed. The apparatus thus described is convenient for carrying out this process; but the process is by no means dependent upon the use of this apparatus, as the same may be carried out by any other apparatus.

Wherever in the claims I have used the expression "low temperature," I intend thereby a temperature less than 100° Fahrenheit.

Having thus described my invention, I claim—

1. The method of continuously making lead hydrate which consists in introducing comminuted metallic lead, water and a limited quantity of an oxidizing reagent into a closed vessel, subjecting the contents to attrition and mixing and continuously drawing off the product with some of the water.

2. The method of continuously making lead hydrate which consists in introducing comminuted metallic lead, water and a limited quantity of an oxidizing reagent into a closed vessel, subjecting the contents to attrition and mixing, continuously drawing off the product with some of the water, separating part of the product from the water and returning the water to the closed vessel.

3. The method of continuously making lead hydrate which consists in introducing comminuted metallic lead, water, and a limited quantity of air into a closed vessel, subjecting the contents to attrition and mixing at a low temperature, continuously drawing off the product with some of the water, separating the product from the water and returning the water to the vessel.

4. The method of continuously making lead hydrate which consists in introducing comminuted metallic lead, water and a limited quantity of air into a closed vessel, subjecting the contents to attrition and mixing at a low temperature, continuously drawing off the product with some of the water, separating the product from the water, returning the water to the vessel, and continuously drawing off air deficient in oxygen.

5. The method of making lead hydrate which consists in subjecting comminuted metallic lead to attrition in a closed vessel containing water and air deficient in oxygen, the contents of the vessel being maintained at a temperature of less than 100° Fahrenheit, and air being introduced slowly to replace the oxygen consumed in the process, substantially as described.

6. The method of continuously making lead hydrate which consists in introducing comminuted metallic lead, water, and air into a closed vessel, subjecting the contents to attrition and mixing and continuously drawing off air deficient in oxygen and replacing it with fresh air in quantities insufficient to maintain the normal proportion of oxygen in the atmosphere, substantially as described.

In testimony whereof I affix my signature in presence of two witnesses.

GEORGE D. COLEMAN.

Witnesses:
HORACE VAN EVEREN,
BENJAMIN PHILLIPS.